United States Patent
Yang et al.

(10) Patent No.: US 8,455,778 B2
(45) Date of Patent: Jun. 4, 2013

(54) SIDE KEY ASSEMBLY FOR PORTABLE ELECTRONIC DEVICE

(75) Inventors: Mu-Wen Yang, Taipei Hsien (TW); Chih-Chiang Chang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 1006 days.

(21) Appl. No.: 12/484,322

(22) Filed: Jun. 15, 2009

(65) Prior Publication Data
US 2010/0039298 A1    Feb. 18, 2010

(30) Foreign Application Priority Data
Aug. 13, 2008  (CN) ............................ 2008 1 0303737

(51) Int. Cl.
*H01H 5/18*    (2006.01)

(52) U.S. Cl.
USPC .......................................................... 200/406

(58) Field of Classification Search
USPC ................... 200/5 R, 5 A, 308, 310, 313, 405, 200/406, 512, 513, 514, 516
See application file for complete search history.

(56) References Cited

U.S. PATENT DOCUMENTS

| | | | | |
|---|---|---|---|---|
| 4,463,234 A | * | 7/1984 | Bennewitz | 200/516 |
| 7,075,026 B2 | * | 7/2006 | Huang et al. | 200/516 |
| 2008/0073186 A1 | * | 3/2008 | Kenmochi | 200/5 A |
| 2011/0114463 A1 | * | 5/2011 | Lee | 200/502 |

* cited by examiner

*Primary Examiner* — Edwin A. Leon
(74) *Attorney, Agent, or Firm* — Altis Law Group, Inc.

(57) ABSTRACT

A side key assembly includes a metallic dome, an insulating layer and a decorative layer. The insulating layer is laminated on the dome. The decorative layer is laminated on the insulating layer.

18 Claims, 4 Drawing Sheets

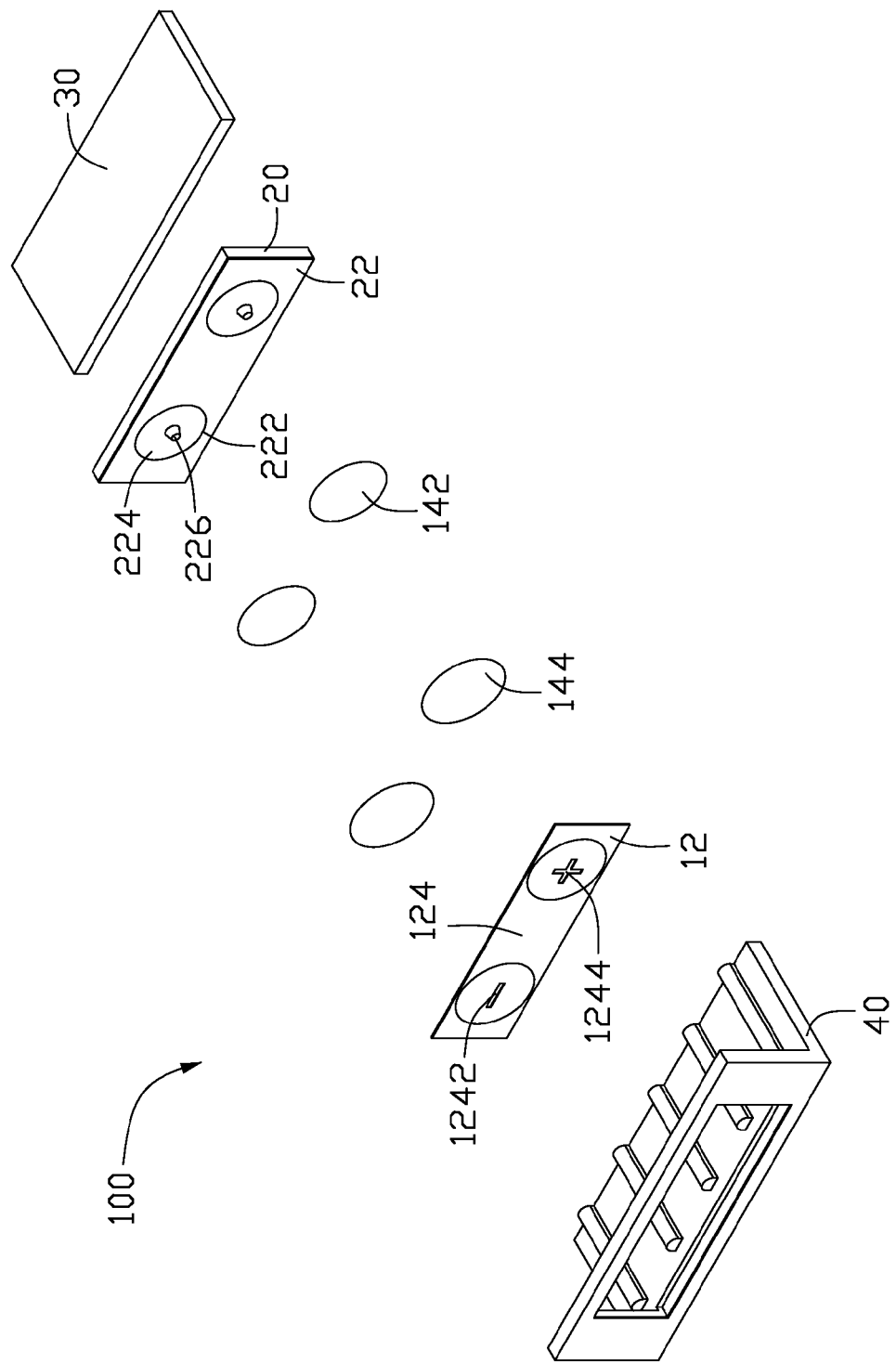

SIDE KEY ASSEMBLY FOR PORTABLE ELECTRONIC DEVICE

BACKGROUND

1. Technical Field

The present disclosure generally relates to side key assemblies, and particularly to side key assemblies used in portable electronic devices.

2. Description of Related Art

Commonly, mobile phones include side keys for convenient one finger operation. However, typical side key assemblies are too thick and make the design and development of smaller and lighter electronic devices for portable use difficult.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the exemplary side key assembly and portable electronic device using the side key assembly. Moreover, in the drawings like reference numerals designate corresponding parts throughout the several views. Wherever possible, the same reference numbers are used throughout the drawings to refer to the same or like elements of an embodiment.

FIG. 4 is similar to FIG. 3, but showing the portable electronic device in another aspect.

DETAILED DESCRIPTION

Figure 1:
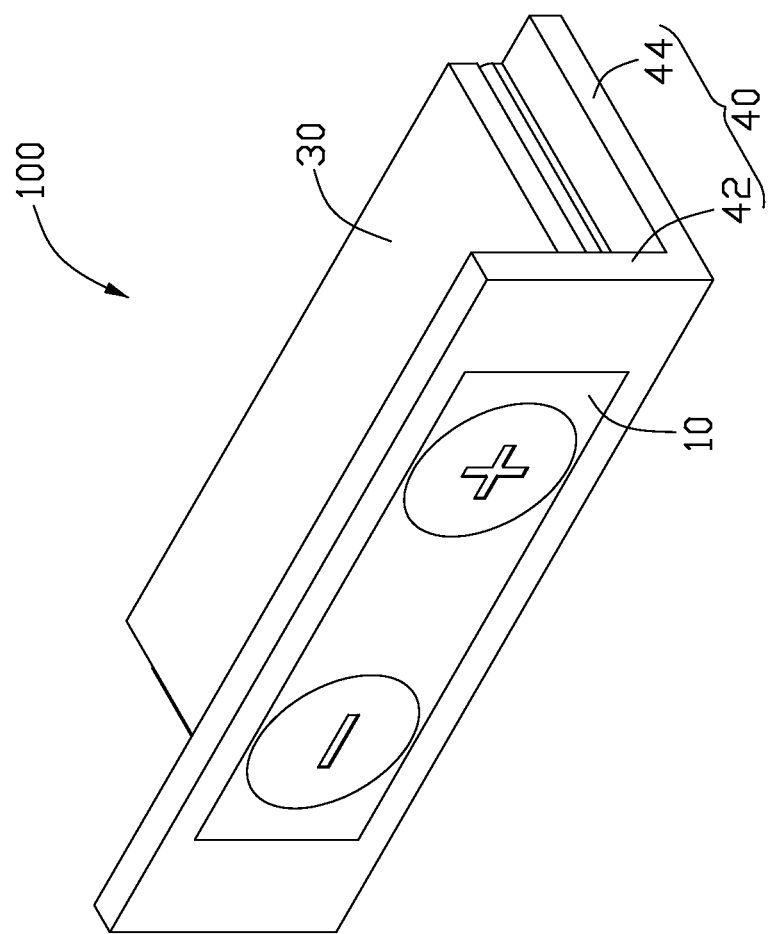
FIG. 1 is an assembled, isometric view of one embodiment of a side key assembly used in a portable electronic device, the portable electronic device including the side key assembly, a housing, and a circuit board.
Figure 2:
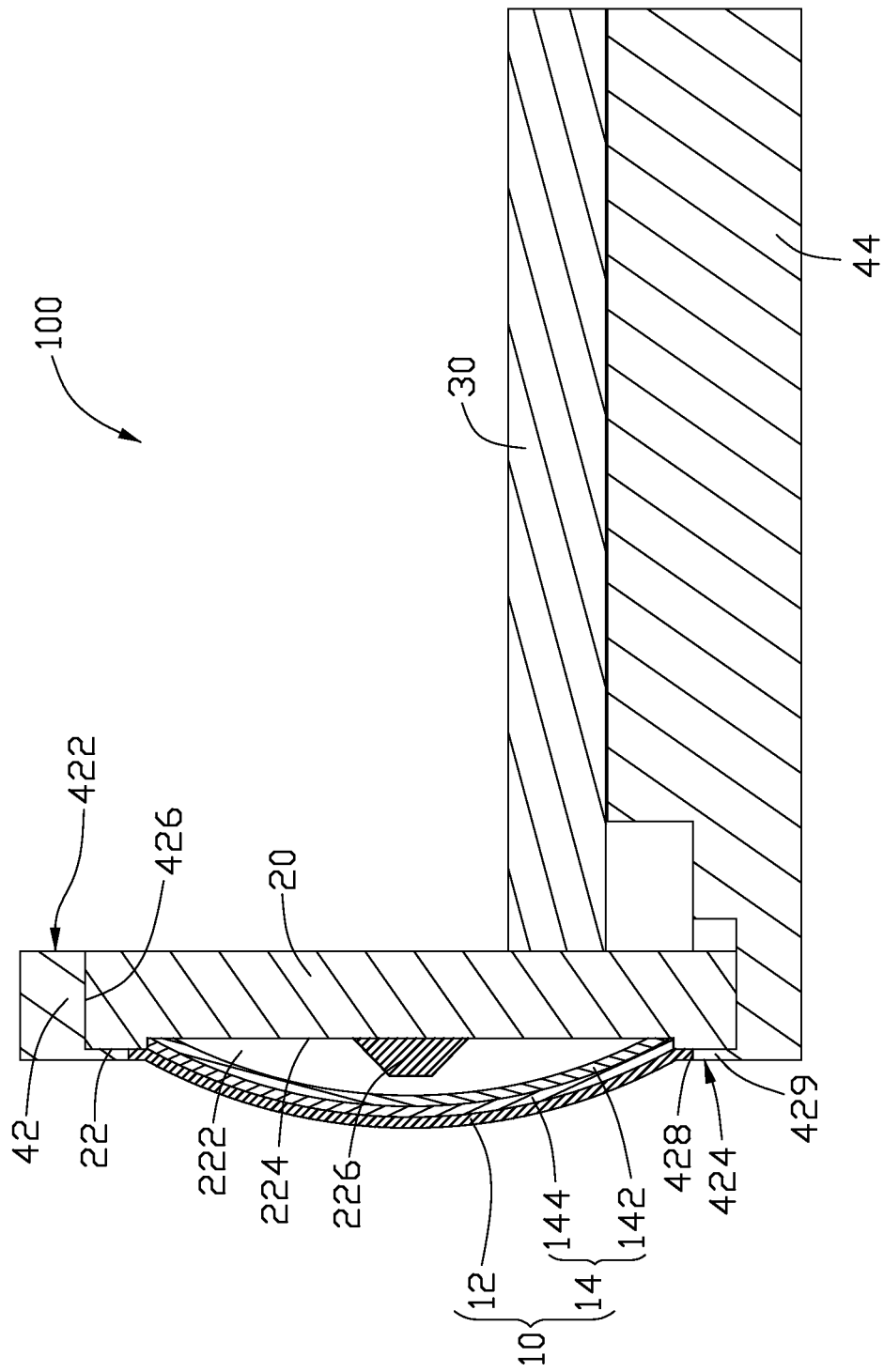
FIG. 2 is a cross sectional view of the portable electronic device shown in FIG. 1.

Referring to FIGS. 1 to 2, an exemplary embodiment of a side key assembly 10 can be used on a portable electronic device 100, such as a cellular phone or any electronic device where a side key is desirable. The portable electronic device 100 includes a side key assembly 10, a circuit board 20, a main board 30, and a housing 40. The side key assembly 10 is mounted to the circuit board 20 to trigger the circuit board 20. The circuit board 20 and the main board 30 are both mounted in the housing 40, and the circuit board 20 is electrically connected to the main board 30.

Figure 3:
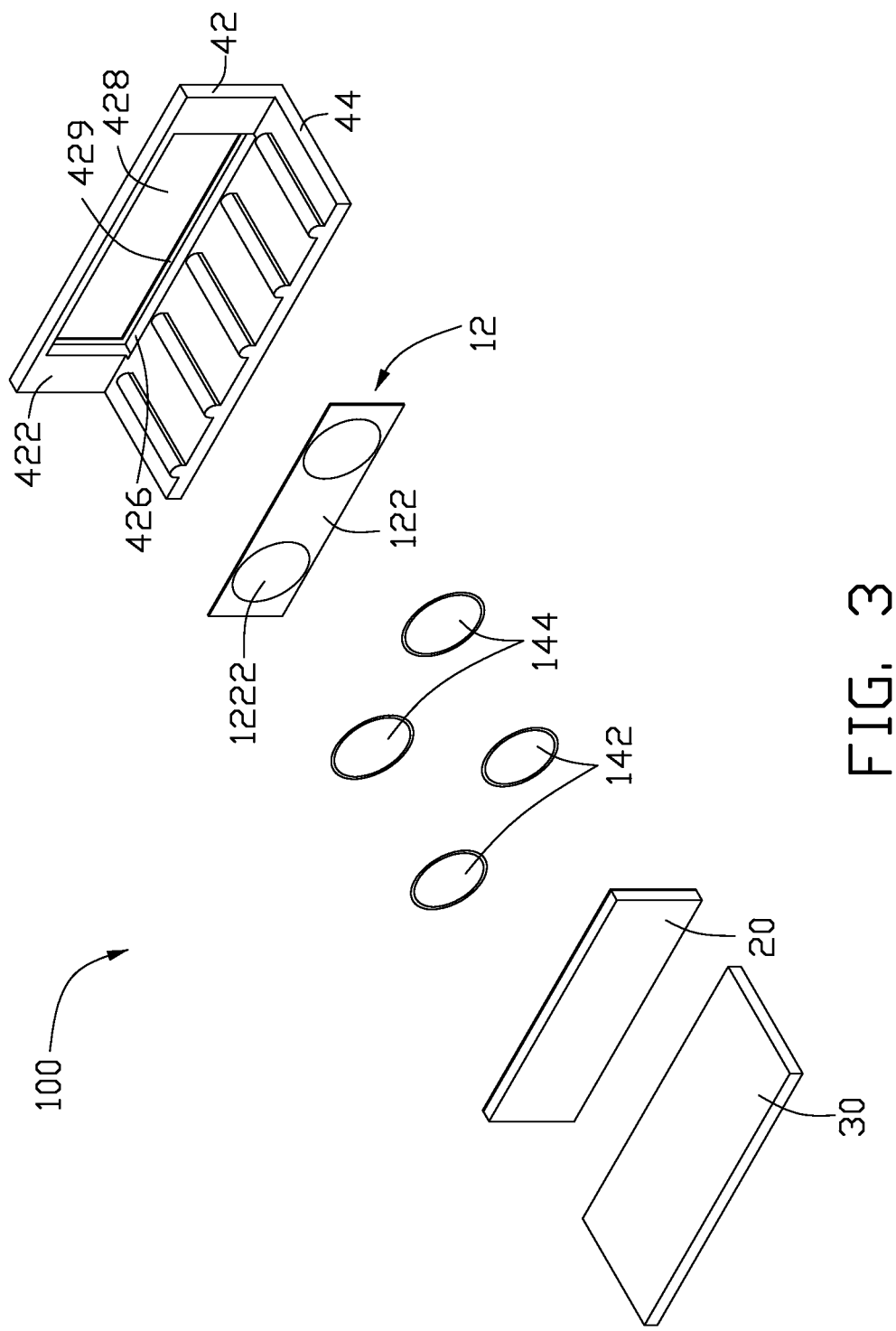
FIG. 3 is an exploded view of the portable electronic device shown in FIG. 1.

Referring to FIGS. 2 and 3, the side key assembly 10 includes a decorative layer 12 and one or more push buttons 14 mounted (e.g., adhered) on the decorative layer 12. The decorative layer 12 has a first surface 122 facing the circuit board 20 and a second surface 124 (Seen in FIG. 4) opposite to the first surface 122. The decorative layer 12 has a plurality of concave portions 1222 defined in the first surface 122. The number of the concave portions 1222 is the same as the push buttons 14. Each concave portion 1222 is configured for accommodating a push button 14 therein.

Referring to FIG. 4, the second surface 124 is an operating surface of the side key assembly 10. The second surface 124 may have a first indicia 1242 and a second indicia 1244 defined thereon and corresponding to the push buttons 14, to indicate the function of the push buttons 14. The first indicia 1242 may be "−", to indicate decrease volume function. The second indicia 1244 may be "+", to indicate increase volume function.

The decorative layer 12 is a film constructed from injection-molded thermoplastic elastomer and constructed to produce a point contact sensation in a user's fingertip to provide tactile feedback when a user presses the push buttons 14. It is envisioned that the decorative layer 12 may have a pattern layer (not shown) formed thereon to improve the appearance of the side key assembly 10.

Each push button 14 includes a metallic dome 142 and a insulating layer 144 laminated on the dome 142. The metallic dome 142 is made of metal material that has high electrical conductivity, such as copper, or stainless alloy. The insulating layer 144 has the same shape as the dome 142 but is larger than the dome 142. When the push button 14 is accommodated in the concave portion 1222 of the decorative layer 12, the insulating layer 144 is laminated between the metallic dome 142 and the decorative layer 12. It is envisioned that the insulating layer 144 may be adhered to the decorative layer 12 for improving bonding engagement between the push button 14 and the decorative layer 12. The insulating layer 144 is a film being made of insulating material, e.g., Polyethylene Terephthalate (PET).

The circuit board 20 includes a third surface 22 facing the side key assembly 10. The circuit board 20 has a plurality of recesses 222 defined in the third surface 22, and each recess 222 has a bottom wall 224 defined therein. The recesses 222 correspond to the push buttons 14, and are configured for accommodating portions of the push buttons 14, correspondingly. Each bottom wall 224 has a signal sensing point 226 mounted at a center thereof. When the push button 14 is pressed, the dome 142 is biased to contact the signal sensing point 226 and triggers the circuit board 20.

The housing 40 has a sidewall 42 and a footwall 44 connecting with the sidewall 42. The sidewall 42 has an inner surface 422 and an outer surface 424 located opposite to the inner surface 422. The sidewall 42 defines a first receiving space 426 with an opening at the inner surface, which communicates with a second receiving space 428 defined therein with an opening at the outer surface 424. The first receiving space 426 is larger than the second receiving space 428, so that a flange 429 is defined in the sidewall 42 framing the first receiving space 426. The first receiving space 426 has the same shape and size as the circuit board 20. The first receiving space 426 is configured for accommodating the circuit board 20. When the circuit board 20 is accommodated in the first receiving space 426, the circuit board 20 is resisted against the flange 429 to prevent the circuit board 20 from sliding out of the first receiving space 426. The cross section of the second receiving space 428 has the same shape and size as the decorative layer 12. The receiving space 428 is configured for accommodating the decorative layer 12.

Because the decorative layer 12 is a film constructed from injection-molded thermoplastic elastomer and the insulating layer 144 is a film made of insulating material, the thickness of the side key is minimized to meet the needs of designing and developing smaller and lighter electronic devices for portable use.

It is to be understood, however, that even though numerous characteristics and advantages of the present embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A side key assembly comprising:
   a metallic dome;
   an insulating layer laminated on the dome; and
   a decorative layer laminated on the insulating layer, wherein the decorative layer has a first surface facing the insulating layer, the decorative layer has a concave portion defined in the first surface, the insulating layer is accommodated in the concave portion.

2. The side key assembly of claim 1, wherein the insulating layer is adhered to the metallic dome.

3. The side key assembly of claim 1, wherein the decorative layer is adhered to the insulating layer.

4. The side key assembly of claim 1, wherein the decorative layer is a film constructed from injection-molded thermoplastic elastomer.

5. The side key assembly of claim 1, wherein the decorative layer has a second surface located opposite to first surface, the decorative layer having indicia formed on the second surface.

6. The side key assembly of claim 1, wherein the metallic dome is made of metallic material having high electrical conductivity.

7. The side key assembly of claim 6, wherein the metallic material is copper, or stainless alloy.

8. The side key assembly of claim 1, wherein the insulating layer is a film being made of insulating material.

9. The side key assembly of claim 8, wherein the insulating material is Polyethylene Terephthalate, (PET).

10. A portable electronic device, comprising:
    a circuit board; and
    a side key assembly, the side key assembly is configured for triggering the circuit board, the side key assembly comprising:
    a metallic dome, an insulating layer laminated on the dome, and a decorative layer laminated on the insulating layer, wherein the decorative layer has a first surface facing the insulating layer, the decorative layer has a concave portion defined in the first surface, the insulating layer is accommodated in the concave portion.

11. The portable electronic device of claim 10, wherein the insulating layer is adhered to metallic dome.

12. The portable electronic device of claim 10, wherein the decorative layer is adhered to the insulating layer.

13. The portable electronic device of claim 10, wherein the decorative layer is a film constructed from injection-molded thermoplastic elastomer.

14. The portable electronic device of claim 10, wherein the decorative layer has a second surface located opposite to first surface, the decorative layer having an indicia formed on the second surface.

15. The portable electronic device of claim 10, wherein the metallic dome is made of metallic material having high electrical conductivity.

16. The portable electronic device of claim 15, wherein the metallic material is copper, or stainless alloy.

17. The portable electronic device of claim 10, wherein the insulating layer is a film being made of insulating material.

18. The portable electronic device of claim 17, wherein the insulating material is PET (Polyethylene Terephthalate).

* * * * *